(12) United States Patent
Forgette et al.

(10) Patent No.: US 8,793,465 B1
(45) Date of Patent: Jul. 29, 2014

(54) METHOD AND SYSTEM FOR STORAGE BLOCK ALIGNMENT

(75) Inventors: Eric P. Forgette, Mechanisville, VA (US); Jonathan H. Dascenzo, Durham, NC (US)

(73) Assignee: Netapp, Inc., Sunnyvale, CA (US)

( * ) Notice: Subject to any disclaimer, the term of this patent is extended or adjusted under 35 U.S.C. 154(b) by 625 days.

(21) Appl. No.: 12/720,056

(22) Filed: Mar. 9, 2010

Related U.S. Application Data

(60) Provisional application No. 61/295,648, filed on Jan. 15, 2010.

(51) Int. Cl.
*G06F 12/02* (2006.01)
(52) U.S. Cl.
USPC ............... 711/201; 711/6; 711/154; 711/170; 718/1
(58) Field of Classification Search
USPC .......................... 711/6, 154, 170, 201; 718/1
See application file for complete search history.

(56) References Cited

U.S. PATENT DOCUMENTS

| 7,296,135 | B2 * | 11/2007 | Thompson | 711/201 |
|---|---|---|---|---|
| 7,809,919 | B2 * | 10/2010 | Thompson | 711/201 |
| 8,171,201 | B1 * | 5/2012 | Edwards, Sr. | 711/6 |
| 8,566,512 | B2 * | 10/2013 | Wolf et al. | 711/103 |
| 2009/0157971 | A1 * | 6/2009 | Liu et al. | 711/133 |

OTHER PUBLICATIONS

Tim Coste, "Storage Block Alignment with VMware Virtual Infrastructure", Jul. 2007, Network Applicane, Inc., TR-3593.*
Joshi et al., "Best Practices for File System Alignment in Virtual Environments", Mar. 2009, NetApp, TR-3747, Version 1.0.*
Stewart et al., "NetApp and VMware vSphere Storage Best Practices", Jun. 2009, NetApp, TR-3749, Version 1.0.*
"Recommendations for Aligning VMFS Partitions", 2009, VMware.*

* cited by examiner

*Primary Examiner* — Arpan P. Savla
(74) *Attorney, Agent, or Firm* — Klein, O'Neill & Singh, LLP (57) ABSTRACT

Method and system for correcting misalignment between a virtual storage device block and a storage device block is provided. To align the blocks, an alignment module adjusts a logical block address and updates virtual storage device information such that a virtual machine can use a virtual storage device with the aligned blocks.

16 Claims, 10 Drawing Sheets

| Virtual Storage Footer | Size (bytes) |
|---|---|
| Cookie | |
| Features | |
| File Format Version | |
| Data Offset | |
| Time Stamp | |
| Creator Application | |
| Creator Version | |
| Creator Host OS | |
| Original Size | |
| Current Size | |
| Disk Geometry | |
| Disk Type | |
| Checksum | |
| Unique Id | |
| Saved State | |
| Reserved | |

| Partition Table Entry | | | |
|---|---|---|---|
| Relative Offsets (within entry) | Length (bytes) | Contents | |
| 0 | 1 | Boot Indicator (80h = active) | 162 |
| 1 - 3 | 3 | Starting CHS values | 164 |
| 4 | 1 | Partition-type Descriptor | 166 |
| 5 - 7 | 3 | Ending CHS values | 168 |
| 8 - 11 | 4 | Starting Sector | 170 |
| 12 - 15 | 4 | Partition Size (in sectors) | 172 |

Structure of the Master Boot Record Sector — 140

| Offsets (within sector) | | Length (in bytes) | Description |
|---|---|---|---|
| in Decimal | in Hex | | |
| 000 – 445 | 000 – 1BD | 446 | Code Area |
| 446 – 509 | 1BE – 1FD | 64 | Master Partition Table — 150 |
| 510 – 511 | 1FE – 1FF | 2 | Boot Record Signature |

FIG. 1G

Partition Table — 150

| Offsets (within MBR sector) | | Length (in bytes) | Contents |
|---|---|---|---|
| in Decimal | in Hex | | |
| 446 – 461 | 1BE – 1CD | 16 | Table Entry for Primary Partition #1 — 152 |
| 462 – 477 | 1CE – 1DD | 16 | Table Entry for Primary Partition #2 — 154 |
| 478 – 493 | 1DE – 1ED | 16 | Table Entry for Primary Partition #3 — 156 |
| 494 – 509 | 1EE – 1FD | 16 | Table Entry for Primary Partition #4 — 158 |

METHOD AND SYSTEM FOR STORAGE BLOCK ALIGNMENT

CROSS-REFERENCE TO RELATED APPLICATIONS

This patent application claims priority to U.S. Provisional Patent Application Ser. No. 61/295,648, entitled "Method and System for Storage Block Alignment", filed on Jan. 15, 2010, the disclosure of which is incorporated herein in its entirety.

TECHNICAL FIELD

The present disclosure relates to storage systems.

BACKGROUND

Virtual machines are commonly used today in computing systems. Virtual machines often share storage space on storage devices. The shared storage space is presented by a system to a virtual machine as a virtual storage space (or virtual drive). The system managing the actual storage space and the system managing the virtual drive may use different starting offsets to read and write information, which may result in misalignment. This misalignment may result in inefficiency in reading and writing information to the virtual drive. Continuous efforts are being made to efficiently use storage space in a virtual machine environment.

SUMMARY

In one embodiment, a method and system for correcting misalignment between a storage system block and a virtual storage device block is provided. A processor executable alignment module gathers metadata information for a virtual storage device by reading a metadata structure. The alignment module adjusts a logical block address to align the storage system block and the virtual storage device block. The alignment module also updates virtual storage device information such that the virtual machine can use the virtual storage device with the aligned blocks.

In another embodiment, a system is provided. The system includes a computing system for executing a plurality of virtual machines; and a virtual interface layer for managing the plurality of virtual machines. The system also includes a storage system for presenting a storage volume to the virtual interface layer which presents a virtual storage device to each of the plurality of virtual machines.

The system further includes an alignment module for aligning a storage volume block and a virtual storage device block by adjusting a logical block address value; generating an intermediate data structure for storing the adjusted logical block address value; and updating a data structure with the adjusted logical block address value such that a virtual machine can access a virtual storage device with the adjusted logical block address value.

In yet another embodiment, a machine implemented method for a computing system executing a plurality of virtual machines and having access to a storage system is provided. The method includes determining misalignment between a storage system block used by the storage system and a virtual machine block used by a virtual machine having access to a virtual storage device; and adjusting a logical block address value for aligning the storage system block and the virtual machine block.

The method further includes generating a new intermediate data structure having metadata for storing the adjusted logical block address value; and updating a data structure with the adjusted logical block address value such that the virtual machine can access the virtual storage device with the adjusted logical block address value.

In another embodiment, a machine implemented method for a computing system executing a plurality of virtual machines and having access to a storage system is provided. The method includes adjusting a partition for a virtual storage device for aligning a storage system block and a virtual machine block; and generating an intermediate data structure for storing adjusted partition information for the virtual storage device.

The method further includes updating a data structure with the adjusted partition information such that a virtual machine can access the virtual storage device with the aligned storage system block and the virtual machine block.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

In one embodiment, a method and system for correcting misalignment between a storage system block and a virtual storage device block is provided. A processor executable alignment module gathers metadata information for a virtual storage device by reading a metadata structure. The alignment module adjusts a logical block address to align the storage system block and the virtual storage device block. The alignment module also updates virtual storage device information such that the virtual machine can use the virtual storage device with the aligned blocks.

As used in this disclosure, the terms "component", "module", "system," and the like are intended to refer to computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Figure 1A:
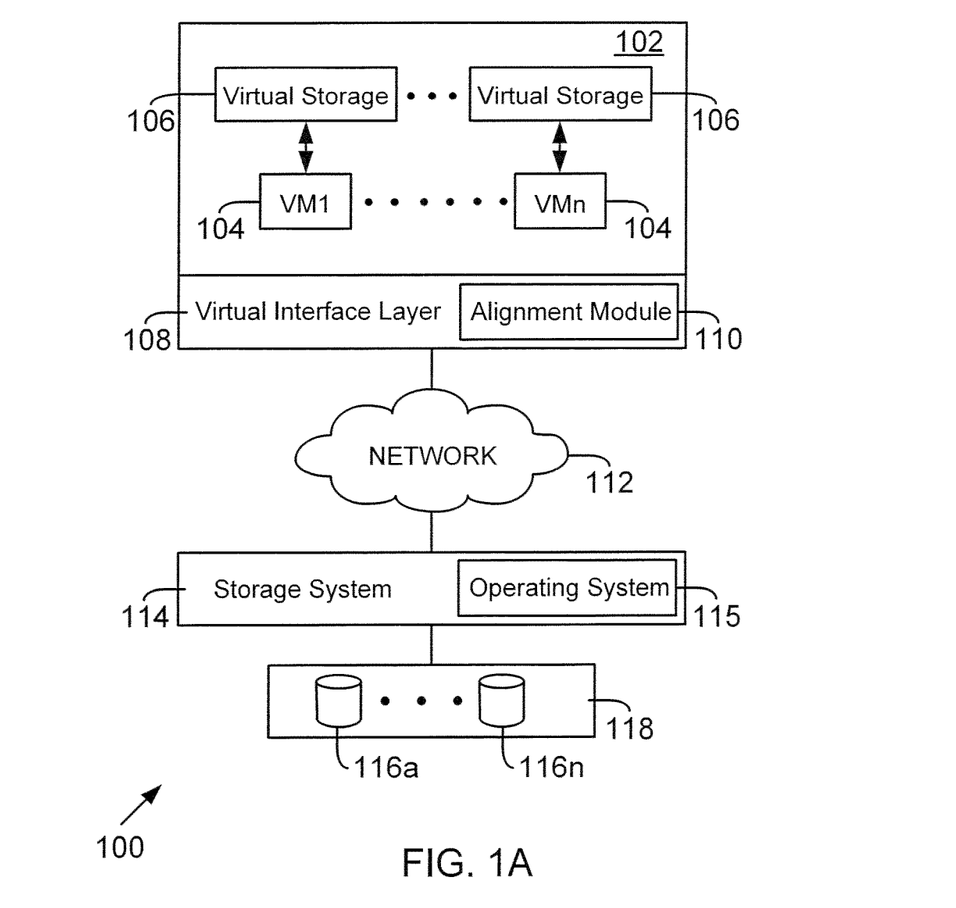
FIG. 1A shows a block diagram of a system used according to one embodiment.

FIG. 1A shows an example of system 100 where the various embodiments disclosed herein may be implemented. System 100 includes a processing system 102 that may include multiple virtual machines (VM1 ... VMn) 104, all sharing the same hardware, including storage sub-system 118. Each virtual machine 104 may be, or may include, a complete operating system. Each virtual machine 104 may also include a file system, for example, NTFS (N Technology File System) to access a virtual storage device that is presented by a storage system 114, as described below. Although only two virtual machines 104 are shown, it is to be understood that essentially any number of virtual machines could reside and execute in the processing system 102.

The term virtual machine as used herein means a software implementation of a hardware based system, for example, a computing system. A virtual machine may execute an operating system just like a computing system. Typically, multiple virtual machines are executed on a computing system and share hardware devices.

Processing system 102 may include or interface with a virtual interface layer 108 (may also be referred to as layer 108) that executes an alignment module 110, according to one embodiment. As an example, virtual interface layer 108 may be a hypervisor layer that includes a processor executable layer for controlling different operating systems. The term virtual interface layer and hyper visor layer may be used interchangeably. The hypervisor layer 108 manages a plurality of virtual machines and facilitates sharing of hardware devices among the plurality of virtual machines.

The hypervisor layer 108 interfaces with storage system 114 and presents virtual storage 106 to virtual machine 104. The hypervisor layer 108 maintains information regarding virtual storage 106 used by the virtual machines 104. Alignment module 110 interfaces with the hypervisor layer 108 for performing alignment, according to one embodiment, as described below.

The hypervisor layer 108 may be executed on the same platform as the virtual machine(s) or on a different standalone computing system(s). In another embodiment, the hypervisor layer 108 may be executed in a distributed architecture, i.e. a first portion is executed by one computing system and the second portion is executed by another computing system.

The processing system 102 may access a storage subsystem 118 directly or via a network 112. Network 112 may be a local area network (LAN), wide area network (WAN), metropolitan area network (MAN), global area network such as the Internet, a Fibre Channel fabric, or any combination of such interconnects.

Storage subsystem 118 may include multiple mass storage devices 116a-116n (may also be referred to as storage device 116) that may be used to store a plurality of data containers. The term data containers as used herein means a block, a file, a logical unit of data or any other information.

The mass storage devices in storage subsystem 118 may be, for example, conventional magnetic disks, optical disks such as CD-ROM or DVD based storage, magneto-optical (MO) storage, flash memory storage device or any other type of non-volatile storage devices suitable for storing data.

Storage subsystem 118 may be managed by a corresponding storage system 114. Storage system 114 may operate as a network storage server or direct attached storage. The storage server may provide file-level data access services to clients (not shown), such as commonly done in a NAS (network attached storage) environment, or block-level data access services such as commonly done in a SAN (storage area network) environment, or it may be capable of providing both file-level and block-level data access services to clients.

Further, although storage system 114 is illustrated as a single unit in FIG. 1A, it can have a distributed architecture. For example, assuming it is a storage server, it can be designed to include one or more network modules (e.g., "N-blade") and one or more disk/data modules (e.g., "D-blade") (not shown) that are physically separate from the network modules, where the network modules and disk/data modules communicate with each other over a physical interconnect. Such architecture allows convenient scaling of the processing system.

As referenced above, system 100 may also include a plurality of client systems. In one embodiment, the virtual machines 104 may operate as a client system to access storage sub-system 118.

Processors executing instructions in storage system 114 and client systems (e.g., 104) communicate according to well-known protocols, such as the NFS protocol or the CIFS protocol, to make data stored on storage 116 appear to users and/or application programs as though the data were stored locally. CIFS means the Common Internet File System Protocol, an access protocol that client systems use to request file access services from a protocol that allows a user to access storage over a network. NFS means Network File System, a protocol that allows a user to access storage over a network.

The storage system 114 can present or export data stored on storage 116 as a volume, where each volume may be configured to store data files, scripts, word processing documents, executable programs, and the like. The term volume means a logical data set which is an abstraction of physical storage, combining one or more physical mass storage devices (e.g., disks) or parts thereof into a single logical storage object, and which is managed as a single administrative unit, such as a single file system.

From the perspective of one of the client systems, each volume can appear to be a single disk drive (or single storage device). However, each volume can represent the storage space in one disk, an aggregate of some or all the storage space in multiple disks, a RAID group, or any other suitable set of storage space.

Figure 1B:
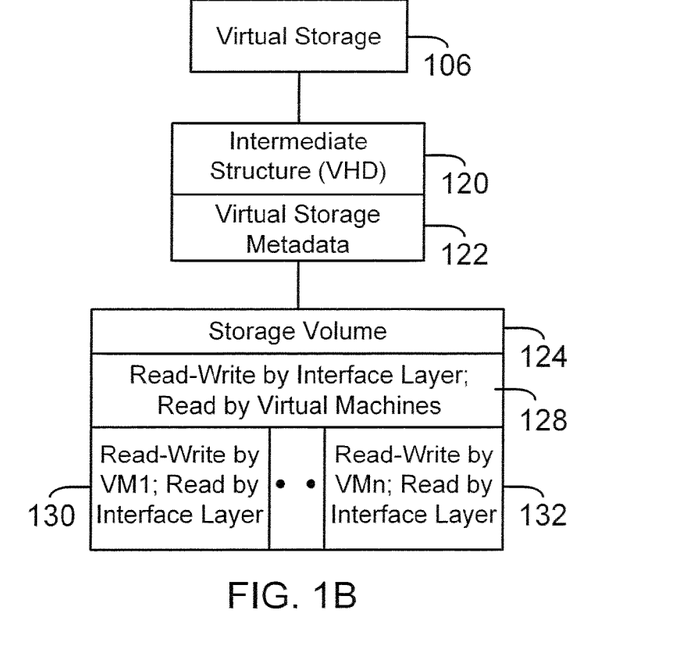
FIG. 1B shows an example of presenting virtual storage to a virtual machine, according to one embodiment.

FIG. 1B shows an example of presenting virtual storage 106 to a virtual machine 104. Storage volume 124 on storage device 116 is managed by storage system 114 and may be segmented into various regions. One region 128 may be configured such that only virtual interface layer 108 can read and write to it, while the virtual machines 104 can only read that region. Segment 130 is configured such that a first virtual machine (e.g., VM1) can read and write to that segment and the interface layer 108 can only read that segment Segment 132 is configured such that a dedicated virtual machine (VM# N) can read and write to this segment, while interface layer 108 can only read this segment.

Storage volume 124 may be presented as a LUN to interface layer 108. The term LUN stands for logical unit number which means a logical entity related to a storage volume. A LUN may be represented as a storage device to an operating system or a virtual machine.

Virtual interface layer 108 then generates an intermediate structure 120, for example, a virtual hard disk file (VHD file) having virtual storage metadata 122 (may also be referred to as virtual drive metadata 122) intermediate structure 120 with the virtual storage metadata 122 is then used as virtual storage (may also be referred to as a virtual drive) 106 by virtual machine 104.

The term drive or storage as used herein may include any type of storage device including conventional magnetic disks, optical disks such as CD-ROM or DVD based storage, magneto-optical (MO) storage, flash memory storage device or any other type of non-volatile storage devices suitable for storing data.

Figure 1C:
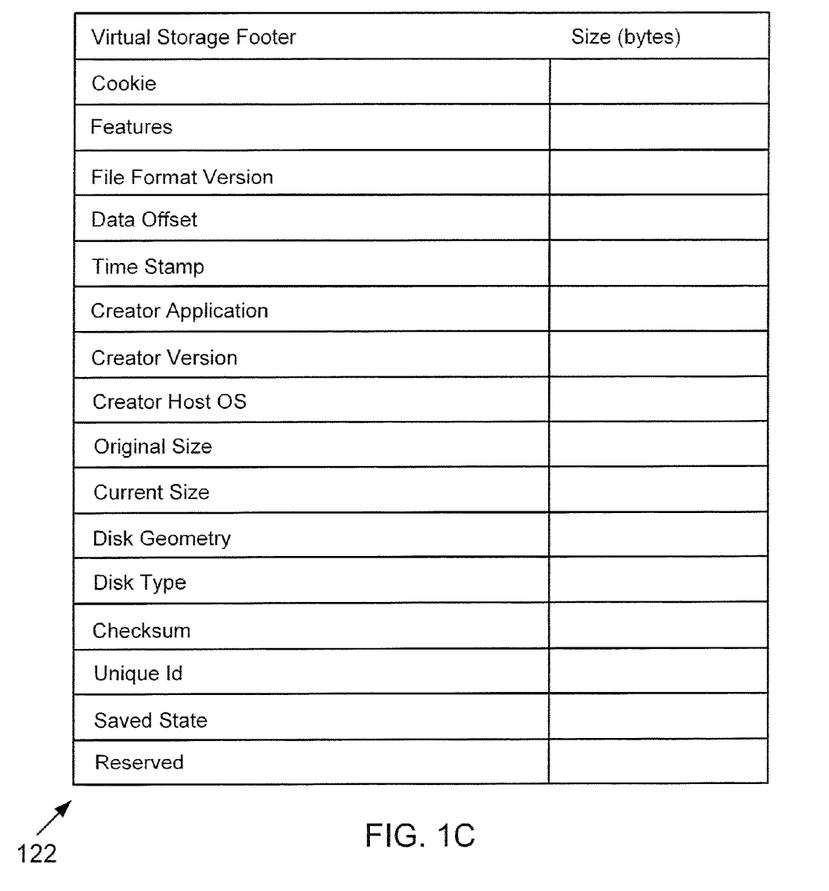
FIG. 1C shows an example of a virtual storage metadata structure, according to one embodiment.

FIG. 1C shows an example of virtual storage metadata 122 with a plurality of fields. The "cookie" field is used to identify an original creator of a storage drive image. The Current/Original size in bytes provides usable storage space for a virtual machine.

Figure 1D:
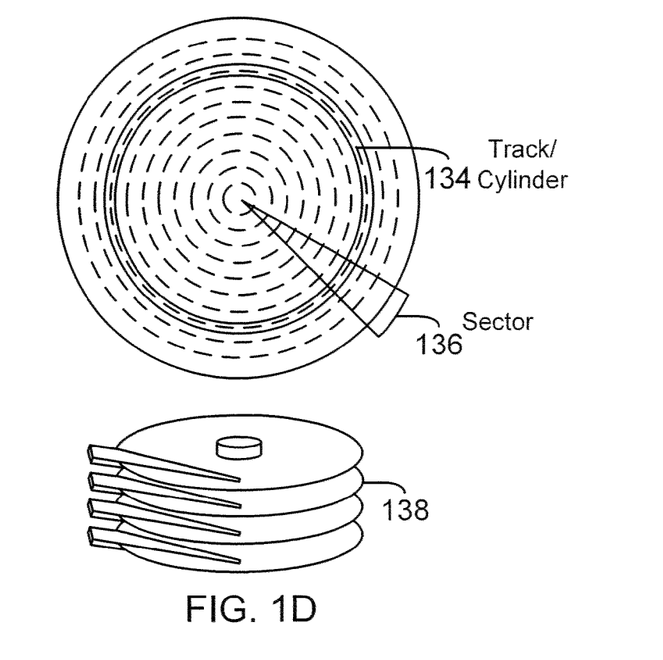
FIG. 1D shows an example of a hard drive, used according to one embodiment.

The disk geometry field provides information regarding the geometry of a storage device, for example, a hard drive. In the case of a hard drive, the geometry may be defined by cylinder, head and sector details. A hard drive typically includes a platter for storing tracks, sectors (136, FIG. 1D) and blocks. A sector or block is a portion of a drive and may be wedge shaped. The head (138, FIG. 1D) is a disk head used for reading and writing platter. A cylinder is defined by multiple tracks across platters, while a track (134, FIG. 1D) is a contiguous circular space where data is stored.

The disk type field identifies a disk type. The unique Id uniquely identifies the drive. The other fields in FIG. 1C are self-explanatory.

Figure 1E:
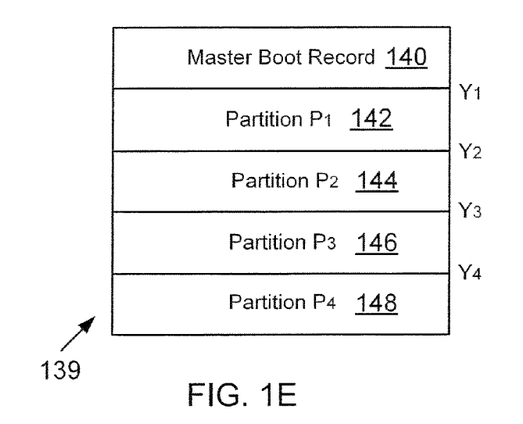
FIG. 1E shows an example of a master boot record, used according to one embodiment.

FIG. 1E shows an example of a storage space layout 139 for a storage device, for example, 116. Layout 139 includes a master boot record (MBR) sector 140 that stores information regarding various storage partitions, for example, P1 142, P2 144, P3 146 and P4 148. MBR sector 140 stores partition information that is used by a computing system processor to read and write information. The partitions have a starting offset value that may be based on a block size used by the system managing storage.

Figure 1F:
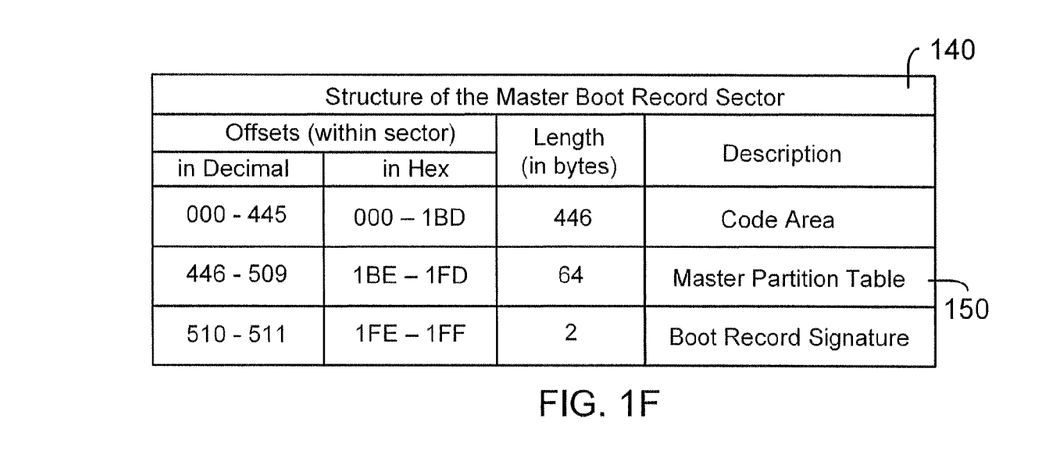
FIG. 1F shows an example of a master boot record sector, used according to one embodiment.
Figure 1G:
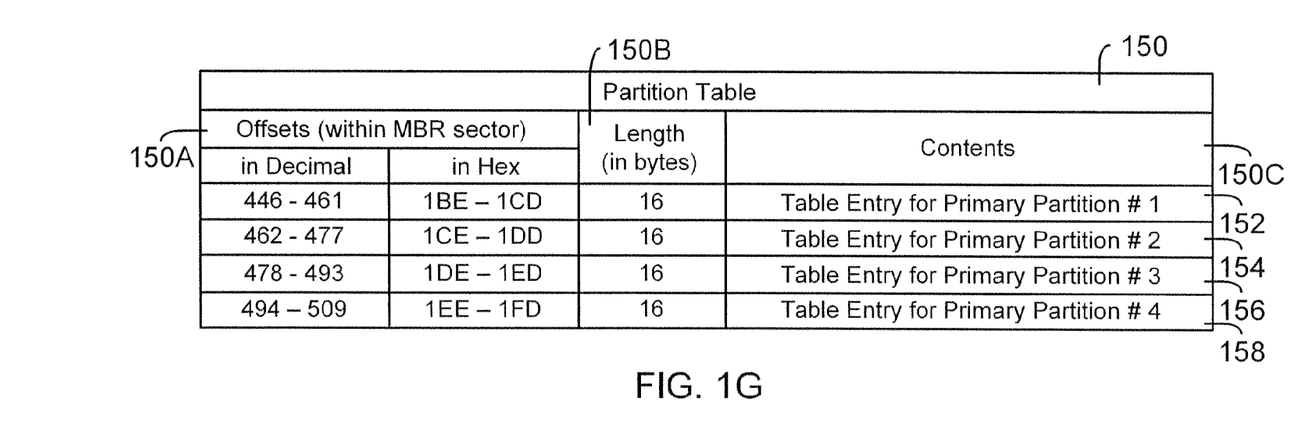
FIG. 1G shows an example of a primary partition table, used according to one embodiment.

FIG. 1F shows an example of MBR sector 140. MBR sector 140 stores a master partition table 150. An example of a master partition table (or data structure) 150 is shown in FIG. 1G. Table 150 may include various columns, for example, column 150A stores an offset value in both decimal and hexadecimal formats. The offset value provides a location from where a MBR sector starts. Column 150B stores a length of the sector, for example, 16 bytes. Column 150C stores entries for individual partition tables 152, 154, 156 and 158. Although only four partitions have been shown, the embodiments disclosed herein are not limited to any particular number of partitions, length of partition tables, or any particular offset value(s).

Figure 1H:
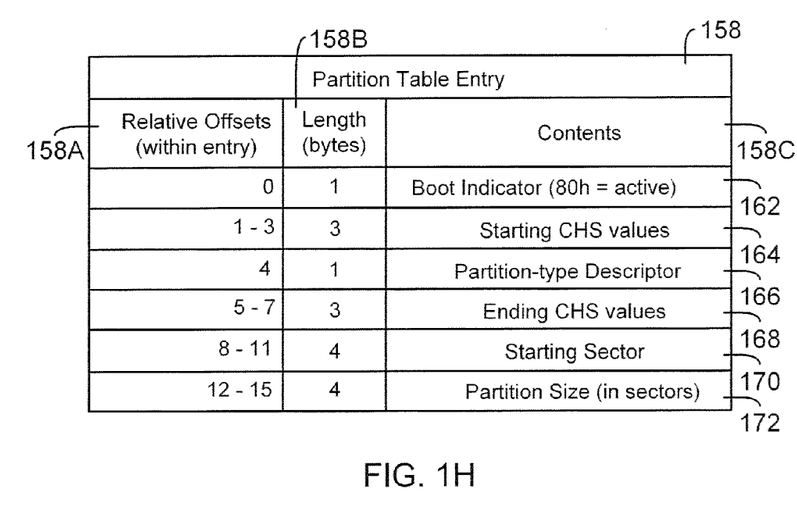
FIG. 1H shows an example of a partition table entry, used according to one embodiment.

FIG. 1H shows an example of a partition table 158 with columns 158A, 158B and 158C. Column 158A stores a relative (or starting) offset value indicating where a partition begins. Column 158B shows the length of each partition table entry that is listed in column 158C.

The boot indicator value 162 indicates whether a partition is bootable. Starting CHS (cylinder/head/sector) (CHS) and ending CHS values (164 and 168) provide information regarding cylinder/head i.e. disk geometry. Partition type descriptor 166 indicates a type of partition for example, a NTFS partition. Starting sector value 170 provides information regarding where a sector starts and can be translated to a LBA that is used by computing systems to access the partition. The term LBA as used herein means a logical block address, which is a common scheme for specifying a location of a block in computer storage devices. LBAs are commonly used to access storage space to read and write information. The partition size 172 provides the size of a partition in sectors.

It is noteworthy that the foregoing examples of MBR and partition tables/data structures with certain offset and size values are only provided to illustrate the adaptive embodiments disclosed herein. The embodiments are not limited to any particular value, number of columns table/data structure layouts.

Figure 2A:
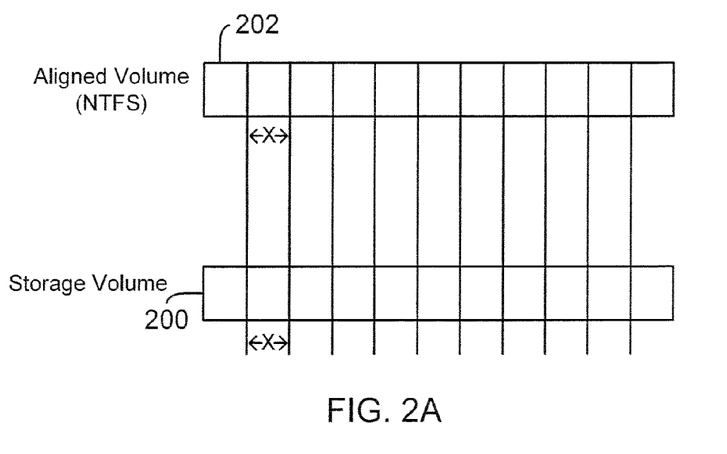
FIG. 2A shows an example of an aligned storage volume and a NTFS volume.

FIG. 2A shows an example of aligned blocks as used by a storage system and a client file system, for example, NTFS. The storage volume 200 is managed by a storage operating system 115 (shown in FIG. 1A). Volume 202 is a volume that is managed by a client file system (or a guest file system). The blocks in volume 200 and 202 are aligned because the starting offset of client file system 202 blocks can be divided by a block size ("X") of the storage volume 200, without a remainder and hence one can easily read and write information without any performance impact.

Figure 2B:
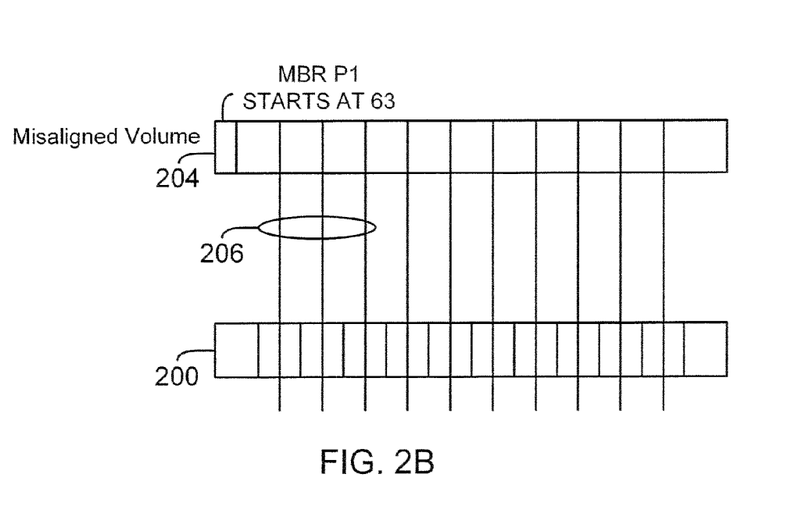
FIG. 2B shows an example of a misaligned volume that is adjusted according to one embodiment.

FIG. 2B shows an example of a misaligned volume 204 with respect to volume 200. Volume 204 in this example may be for virtual storage 106 used by a virtual machine. In this example, the first partition starts at sector 63 (i.e. starting offset is 63) which may not be equally divisible by Xkb, the block size used for volume 200 (for example, 4 kb block size). The misalignment between the two storage representations is shown by vertical lines 206.

Figure 2C:
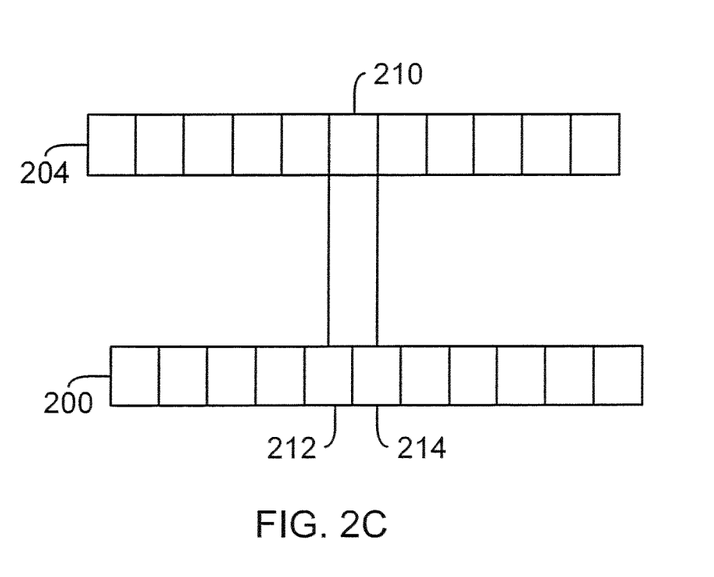
FIG. 2C illustrates a read operation when there is misalignment between the NTFS and storage volume blocks.

The foregoing misalignment may result in performance loss, for example, during a read operation. This is illustrated in FIG. 2C. To read a block 210 from the misaligned VHD volume 204, one has to read two corresponding blocks 212 and 214 from storage volume 200.

Figure 2D:
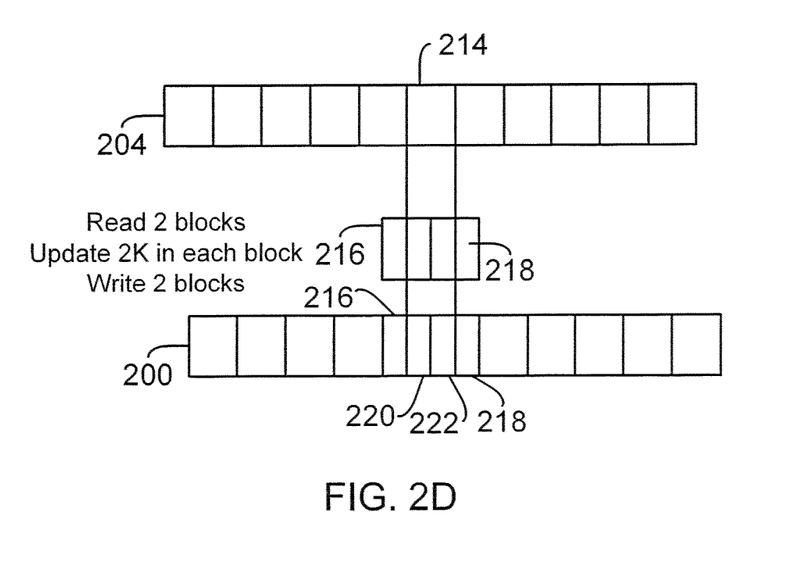
FIG. 2D illustrates a write operation when there is misalignment between the NTFS and storage volume blocks.

To write to a block 214 at storage volume 204 is even more complex as shown in FIG. 2D. Before a system can write to block 214, one has to read two blocks 216 and from storage volume 200 and then write in two blocks 220 and 222. This is an inefficient write operation because to write a block at a virtual storage volume 204 one has to go through multiple blocks at the actual storage volume 200.

Because virtual machines are now commonly used, such misalignment and performance loss is commercially undesirable. The present embodiments provide alignment module 110 to solve this problem, as described below.

Figure 3A:
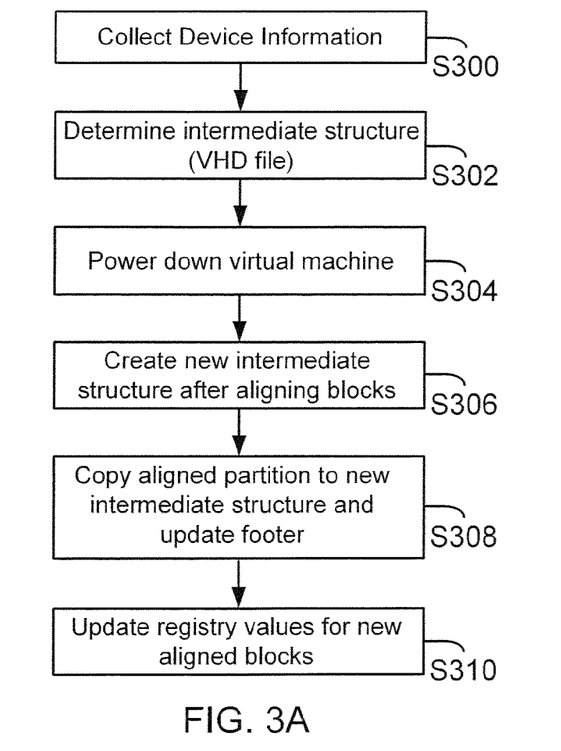
FIG. 3A shows an example of a process flow diagram, according to one embodiment.

FIG. 3A shows a process flow diagram for solving the misalignment issues due to different block starting offsets, according to one embodiment. The process starts in block S300, when device information is collected. In one embodiment, alignment module 110 collects basic information regarding virtual storage 106, for example, a virtual storage identifier identifying virtual storage 106. Alignment module 110 gathers the information from virtual interface layer 108.

In block S302, alignment module 110 obtains detailed virtual storage information from virtual storage metadata 122 (FIG. 1B) and the block size used by the storage system 114. Virtual storage information may include storage device geometry, LBA and a block size that is used by the virtual machine system. Alignment module 110 may display the intermediate structure (for example, VHD files) to a user on a display device. This allows the user to select a VHD file whose partitions need to be aligned.

In block S304, an intermediate structure is selected for alignment and the associated virtual machine is placed in a state such that it does not have access to the virtual storage while the alignment is corrected.

In block S306, alignment module 110 aligns the partitions for virtual storage and the storage device. The alignment operation is based on the difference in the starting offset for the blocks of storage volume (200) and the starting offset used by the VHD (204). Once the partitions are aligned, alignment module 110 creates a new intermediate structure, for example, a new VHD file.

Alignment module 110 may use the following relationship to determine alignment and then subsequently correct the alignment in a new intermediate structure: (Logical block address*block size used by virtual machine)Mod(storage system block size). If the LBA address is 63 (FIG. 2B), block size used by the virtual machine is 512 kb and the block size used by the storage system is 4096, then the misalignment is (63*512)Mod(4096)=3584. Alignment module 110 adjusts the LBA values to correct the misalignment. For example, if everything remains the same and the LBA value is changed to 64, then there is no misalignment between the partitions because (64*512)Mod(4096)=0.

In block S308, aligned partition data is copied to the new intermediate structure. The virtual storage metadata 122 is also updated so that it includes new and aligned partition values. The starting offset information as used by the virtual machine file system, for example, NTFS, may also be updated to reflect the adjusted LEA values. The virtual machine operating system may store the offset information in a metadata object (not shown). The adjusted LBA values are changed in the metadata object so that the file system used by the virtual machine can recognize the adjusted LBA values for the aligned blocks.

In block S310, registry values in a device register (or a data structure) are updated so that the aligned blocks can be recognized by the virtual machine, using a previously assigned drive. For example, a virtual machine may have a drive X assigned to a virtual storage whose blocks are not aligned to a storage volume block. Aft the blocks are aligned, if the device registry is not updated, the virtual machine will not be able to use the same drive with new partition information.

Figure 3B:
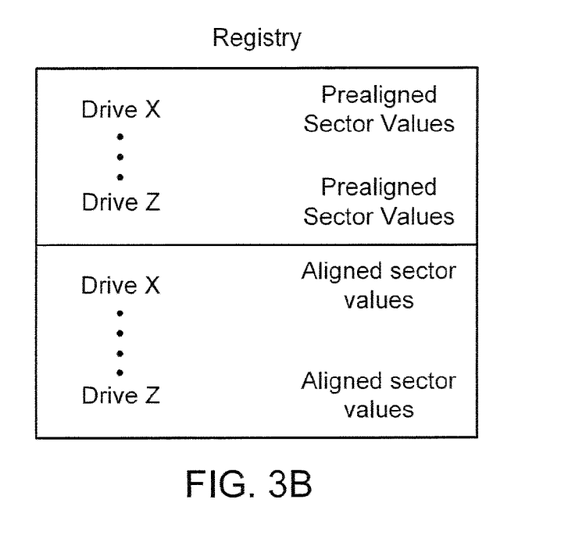
FIG. 3B shows an example of a device registry that is adjusted, according to one embodiment.

In block S310, alignment module 110 also updates the sector addresses for the aligned blocks. FIG. 3B shows an example of updated registry values in a device register with pre-aligned and aligned sector values.

Figure 4:
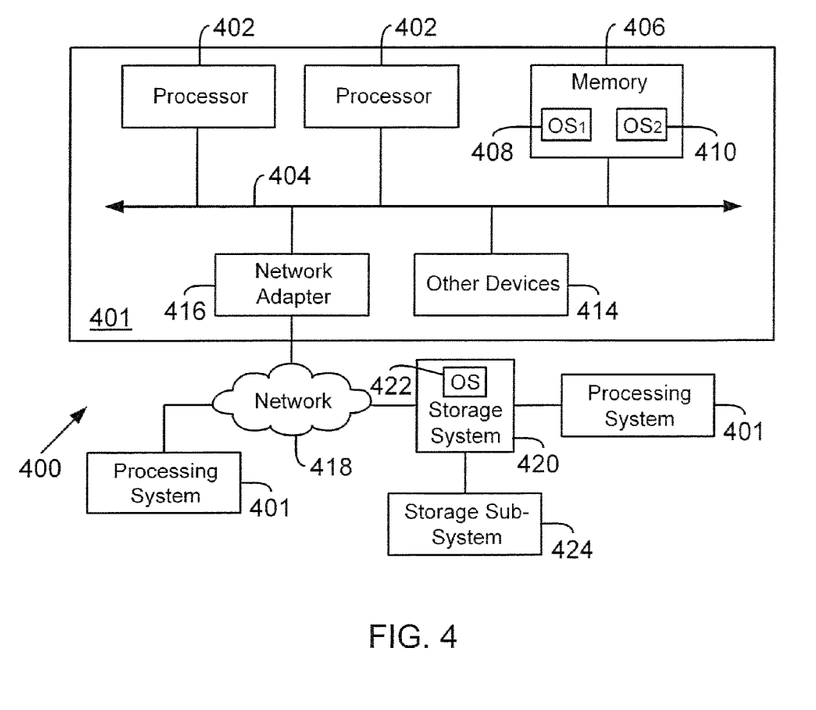
FIG. 4 shows an example of a system using the alignment module, according to one embodiment.

FIG. 4 is a high-level block diagram of a system 400 that is similar to system 100 (FIG. 1A) having a plurality of processing systems 401. The processing system 401 includes multiple processors 402 and memory 406 coupled to a interconnect 404. The interconnect 404 shown in FIG. 4 is an abstraction that represents any one or more separate physical buses, point-to-point connections, or both connected by appropriate bridges, adapters, or controllers. The interconnect 404, therefore, may include, for example, a system bus, a Peripheral Component Interconnect (PCI) family bus, a HyperTransport or industry standard architecture (ISA) bus, a small computer system interface (SCSI) bus, a universal serial bus (USE), IIC (I2C) bus, an Institute of Electrical and Electronics Engineers (IEEE) standard 1394 bus (sometimes referred to as "Firewire"), or any combination of such interconnects.

The processors 402 include central processing units (CPUs) of the processing system 401 and, thus, control the overall operation of the processing system 401. In certain embodiments, the processors 402 accomplish this by executing software or firmware stored in memory 406. The processors 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 406 is, or includes, the main memory of the processing system 401. The memory 406 represents any form of random access memory (RANI), read-only memory (ROM), flash memory, or the like, or a combination of such devices. In use, the memory 406 may contain, among other things, multiple operating systems OS1 408, OS2 410, each of which is (or is part of) a virtual machine 104. The multiple operating systems OS1 408, OS2 410 can be different types of operating systems or different instantiations of one type of operating system, or a combination of these alternatives.

Also connected to the processors 402 through the interconnect 404 is a network adapter 416. The network adapter 416 provides the processing system 401 with the ability to communicate with remote devices over the network 418 and may be, for example, an Ethernet, Fibre Channel, ATM, or Infiniband adapter.

If virtual interface layer 108 (FIG. 1A) is executed by a separate computing system, then that computing system may have a structure similar to processing system 402, except memory 406 in that instance will have instructions to execute virtual interface layer 108 and alignment module 110 (or portions of alignment module 110).

Storage system 420 may also be similar to processing system 401, except memory 406 in that instance may have different executable instructions, including storage operating system 422 (similar to 115, FIG. 1A), portions of alignment module 110 (not shown in FIG. 4) and other instructions.

Figure 5:
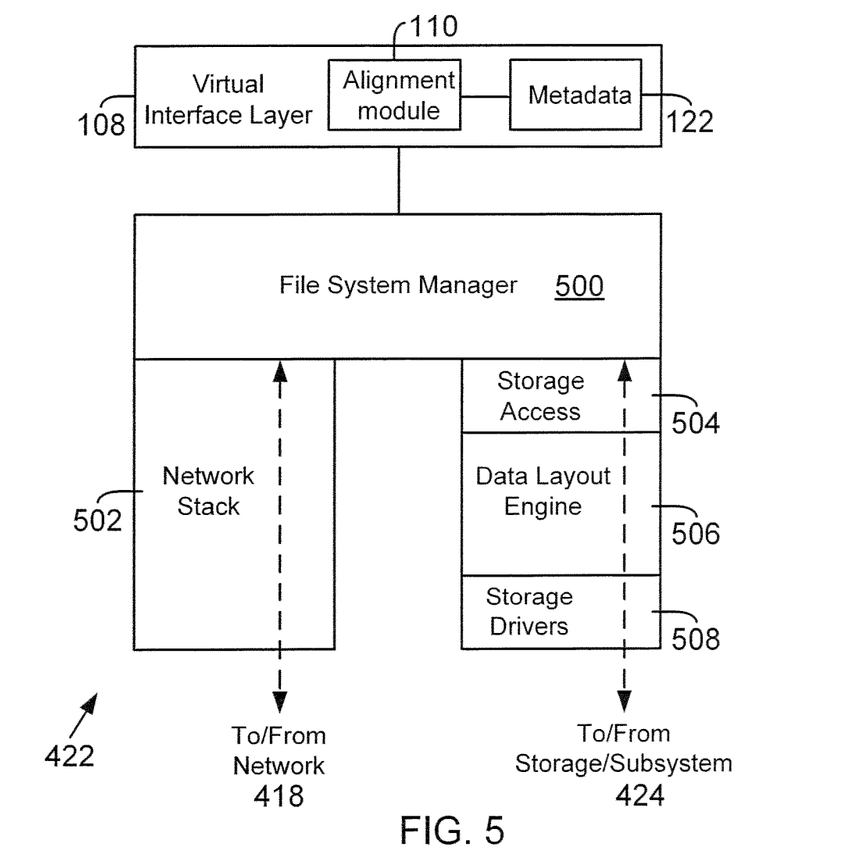
FIG. 5 shows an example of a storage operating system interfacing with a virtual interface layer, according to one embodiment.

FIG. 5 schematically illustrates an example of an operating system 422 (or 115, FIG. 1A) that can be implemented in storage system 420 (or 114, FIG. 1A) interfacing with virtual interface layer 108. The operating system 422 is a network storage operating system which includes several software modules, or "layers". These layers include a file system manager 500, which is the core functional element of the operating system 422. The file system manager 500 is, in certain embodiments, software, which imposes a structure (e.g., a hierarchy) on the data stored at a storage sub-system 424 and which services read and write requests from clients.

Logically "under" the file system manager 500, to allow the storage system to communicate over the network 418 (e.g., with clients), the operating system 422 also includes a network stack 502. The network stack 502 implements various network protocols to enable the processing system to communicate over the network 418.

Also the operating system 422 includes a storage access layer 504, an associated storage driver layer 508, and may include a data layout engine 506 disposed logically between the storage access layer 504 and the storage drivers 508. The storage access layer 504 implements a higher-level storage redundancy algorithm, such as RAID-3, RAID-4, RAID-5, RAID-6 or RAID-DP. The storage driver layer 508 implements a lower-level protocol. The data layout engine 506 may be used to interface with the virtual interface layer 108.

As used herein, the term "storage operating system" generally refers to the computer-executable code operable on a computer to perform a storage function that manages data access and may, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety storage system architectures including, but not limited to a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in place file system.

Thus, a method and apparatus for correcting storage block misalignment is provided. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A system, comprising:
a computing system that executes a plurality of virtual machines;
a virtual interface layer that manages the plurality of virtual machines;
a storage system that presents a storage volume to the virtual interface layer which presents storage space of a plurality of storage devices of a storage sub-system to each of the plurality of virtual machines;
and a processor executable alignment module interfacing with the virtual interface layer to collect a logical block address value and a virtual storage device block size for a virtual storage device that is used by a virtual machine to store information;
interfacing with the storage system to obtain a block size for a storage volume block used by the storage system to store information for the virtual storage device;
automatically aligning the storage volume block size and the virtual storage device block size by adjusting the logical block address value to the storage volume block size;
automatically generating an intermediate data structure to store the adjusted logical block address value; and
updating a data structure at a registry of the virtual machine with the adjusted logical block address value such that the virtual machine can access the virtual storage device with the adjusted logical block address value at the intermediate data structure.

2. The system of claim 1, wherein the intermediate data structure includes metadata for storing the adjusted logical block address value for the virtual storage device.

3. The system of claim 1, wherein the virtual interface layer is executed by a computing system different from the computing system that executes the virtual machine.

4. The system of claim 1, wherein the virtual interface layer is executed by a same computing system that executes the virtual machine.

5. The system of claim 1, wherein the alignment module is executed by the virtual interface layer.

6. A machine implemented method for a computing system executing a plurality of virtual machines and having access to a storage system, comprising:
determining misalignment between a storage system block size used by the storage system to store information and a virtual machine block size used by a virtual machine having access to a virtual storage device for storing information at a storage device managed by the storage system;
adjusting a logical block address value for aligning the storage system block size and the virtual machine block size; wherein for adjusting the logical block address value, a processor executable alignment module interfaces with a virtual interface layer to collect information regarding the logical block address value and the virtual machine block size for the virtual storage device used by the virtual machine for storing information; and interfaces with the storage system to obtain the storage system block size used by the storage system to store information at the storage device;
the alignment module, automatically generating a new intermediate data structure having metadata for storing the adjusted logical block address value; and
the alignment module updating a data structure with the adjusted logical block address value at a registry of the virtual machine such that the virtual machine can access the virtual storage device with the adjusted logical block address value.

7. The method of claim 6, wherein the virtual interface layer is used for managing the plurality of virtual machines.

8. The method of claim 7, wherein the alignment module is executed by the virtual interface layer.

9. The method of claim 6, wherein the virtual interface layer is executed by a computing system different from the computing system that executes the virtual machine.

10. A machine implemented method for a computing system executing a plurality of virtual machines and having access to a storage system, comprising:
   adjusting a partition for a virtual storage device for aligning a storage system block size and a virtual machine block size used by a virtual machine to store information via the virtual storage device; wherein for adjusting the partition, a processor executable alignment module collects information regarding a logical block address and the virtual machine block size used by the virtual storage device from a virtual interface layer that manages the virtual storage device; and interfaces with the storage system to obtain the storage system block size used by the storage system to store information on behalf of the virtual storage device;
   the alignment module, automatically generating an intermediate data structure for storing adjusted partition information for the virtual storage device; and
   the alignment module automatically updating a data structure at a registry for the virtual machine with the adjusted partition information such that the virtual machine can access the virtual storage device with the aligned storage system block size and the virtual machine block size.

11. The method of claim 10, wherein the virtual interface layer is used for managing the plurality of virtual machines.

12. The method of claim 10, wherein the alignment module is executed by the virtual interface layer.

13. The method of claim 10, wherein the intermediate data structure includes metadata for storing the adjusted partition information for the virtual storage device.

14. The method of claim 10, wherein the virtual interface layer is executed by a computing system different from the computing system that executes the virtual machine.

15. The method of claim 10, further comprising:
   determining misalignment between the storage system block size and the virtual machine block size.

16. The method of claim 15, wherein the alignment module determines the misalignment by accessing an initial intermediate data structure.

* * * * *